United States Patent [19]
Baron

[11] Patent Number: 5,534,949
[45] Date of Patent: Jul. 9, 1996

[54] TWO CHANNEL FIELD SEQUENTIAL COLOR DISPLAY SYSTEM

[75] Inventor: Peter C. Baron, Fullerton, Calif.

[73] Assignee: Hughes Aircraft Company, Los Angeles, Calif.

[21] Appl. No.: 224,912

[22] Filed: Apr. 8, 1994

[51] Int. Cl.⁶ ........................................ H04N 9/12
[52] U.S. Cl. .................... 348/742; 348/750; 348/778
[58] Field of Search ................................ 348/742, 776, 348/778, 750, 758

[56] References Cited

U.S. PATENT DOCUMENTS

| | | | |
|---|---|---|---|
| 5,115,305 | 5/1992 | Baur et al. | 358/60 |
| 5,300,942 | 4/1994 | Dolgoff | 345/32 |
| 5,357,288 | 10/1994 | Hiroshima et al. | 348/742 |

FOREIGN PATENT DOCUMENTS

| | | |
|---|---|---|
| 0492637 | 7/1992 | European Pat. Off. . |
| 2089616 | 6/1982 | United Kingdom . |

Primary Examiner—Victor R. Kostak
Assistant Examiner—Juan G. Acosta
Attorney, Agent, or Firm—Georgann S. Grunebach; Wanda K. Denson-Low

[57] ABSTRACT

A two-channel field sequential display system utilizes both simultaneous and sequential color display methods to display full color images in a way that is less complex, smaller in size and less costly than prior art additive color systems, while exhibiting higher light output and fewer temporal visual effects than prior art single-channel field sequential color display systems. The two-channel field sequential display system displays two of three primary colors that make up the image simultaneously during a portion of a display frame and displays the third primary color sequentially during a subsequent part of the display frame. The two-channel field sequential color display concept may be applied to any projection system which combines individual monochrome projector outputs to form an image on a screen or to any display technique that is capable of superimposing two images. The projectors can be implemented with any reflective or transmissive light valve based projection system, or any appropriately color modulated emissive source.

16 Claims, 3 Drawing Sheets

TWO CHANNEL FIELD SEQUENTIAL COLOR DISPLAY SYSTEM

BACKGROUND OF THE INVENTION

1. Field of the Invention

The present invention relates to color display systems. More specifically, the present invention relates to the use of a two-channel field sequential color display system for generating high resolution, full color images from an electronic source.

2. Description of the Related Art

There is a need for low cost, high resolution color display systems for use in large screen, high-definition television sets and other commercial, industrial, training and entertainment display products. Current technology cannot deliver, at an affordable cost, either the resolution or the high light output required for viewing in an acceptable ambient lighting environment.

Prior color display systems that generate full color images from an electronic source fall into three categories: (1) Additive color Systems, (2) Single-Channel Field Sequential Color Systems and (3) "Spatial Multiplexing" Systems. In additive color display systems, such as those described by H. Noda et al. "High Definition Liquid Crystal Projection Television", *Japan Display '89—Proceedings of the Ninth International Display Research Conference,* Oct. 16–18 1989, 256–259 (1989), the three primary colors (red, green and blue) are displayed using three separate image sources (channels). The three channels project three different color representations of the same image simultaneously such that the three separate images overlap at an image plane. The three color images "add" up to give an accurate full color representation of the image. The main problem with this approach is cost. Three separate image sources are required, each with its own set of associated optics. Another problem is size. The higher the number of channels, the larger the system. In addition, a complicated projection lens is usually required with this approach.

In single-channel field sequential color systems, such as the Tektronix model Nu900M color monitor, a single image source or channel is used. The three primary color images are displayed sequentially during one display frame. Display frame rates are typically 60 Hz ($\frac{1}{60}$ of a second per frame). The three primary color images are displayed in sequence at a rate that is four times the frame rate (typically 180 Hz) so that all three color images are displayed over the course of one frame. This technique is preferable over additive systems in terms of cost and complexity because only one image source is used.

The main disadvantage of field sequential color systems is reduced light output (luminance). This is due to the fact that only one image source is used. Each separate color image is displayed for only one-third of a frame as compared to a full frame in the additive system. In addition, since the intensity distribution of the image will change according to which color is being displayed, the image source must be able to respond or switch in $\frac{1}{180}$ of a second as opposed to $\frac{1}{60}$ of a second in an additive system (all three color image sources remain static for one full frame in an additive system). A third problem with this approach has to do with the response of the human eye. For typical conditions of display luminance, surround luminance and ambient lighting, most observers see the three sequential color images as if they were projected simultaneously. However, a segment of the viewing population observes a red and/or green and/or blue color flashes (temporal visual effects) as a result of the sequential displaying of the three color images.

The spatial multiplexing approach is the basis for most color television sets. In this approach, three color dots or stripes are placed in close proximity to each other and are used to represent one image pixel. This three dot or three stripe structure generates the sensation of color. However, the field of view is limited with this approach because the merging of the three color dots or stripes into a single combined color only works if the width of the three color dots or stripes subtends a smaller angle at the eye than the visual acuity of the eye. For example, a 1,000-line, 3,000-stripe device has a maximum obtainable field of view of only 33 degrees.

SUMMARY OF THE INVENTION

In view of the limitations of prior display systems, the object of the present invention is to provide a full color image display system that is less complex, smaller in size and less costly than prior art additive color systems, while exhibiting higher light output and fewer temporal visual effects than prior art single-channel field sequential color display systems.

These improvements are achieved by the use of two image generating devices that are operated in both simultaneous and field sequential modes. A display frame (typically $\frac{1}{60}$ of a second) is divided into two or more fields. During one field, the two image generating devices display two of three primary colors simultaneously. During another field the third primary color is displayed.

The present invention is simpler and less costly than prior three-channel additive systems because the number of image sources is reduced from three to two. In addition, the associated optics are simplified, compared to conventional additive systems, as a result of the reduced number of channels.

With respect to conventional one-channel field sequential systems, the present invention reduces temporal visual effects significantly because only two colors are displayed sequentially, as opposed to three in the one-channel system. For example, in a red+green/blue (RG/B) implementation of the invention, red and green are preferably displayed simultaneously (yellow color), and blue displayed sequentially. The two sequential colors are thus yellow and blue. In one-channel field sequential systems, the red, green and blue colors are all displayed sequentially.

The two-channel field sequential color display concept may be applied to any projection system which combines individual monochrome projector outputs to form an image on a screen or to any display technique that is capable of superimposing two images. The projectors can be implemented with any reflective or transmissive light valve based projection system, or any appropriately color modulated emissive source. In a projector system implementation, two projectors would generate different color images independently, but time synchronized, on the screen both simultaneously and time sequentially.

The number of fields per display frame, the order in which the colors are displayed by the two channels and which two of the three colors are displayed simultaneously are parameters that can be varied in order to address specific display requirements.

These and other features and advantages of the invention will be apparent to those skilled in the art from the following detailed description of preferred embodiments, taken together with the accompanying drawings, in which:

DETAILED DESCRIPTION OF THE INVENTION

The present invention combines both simultaneous and sequential color display techniques to provide a full color image display system that is less complex, smaller in size and less costly than prior art additive color systems, while exhibiting higher light output and fewer temporal visual effects than prior art single-channel field sequential color display systems.

Figure 1A:
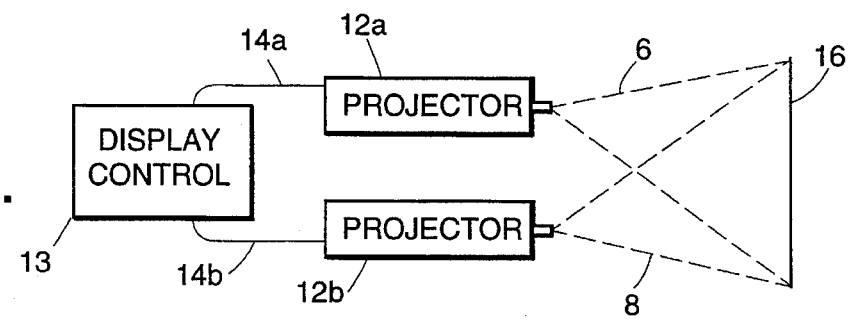
FIGS. 1a and 1b are schematic diagrams showing a generic two channel field sequential color display system.
Figure 1B:
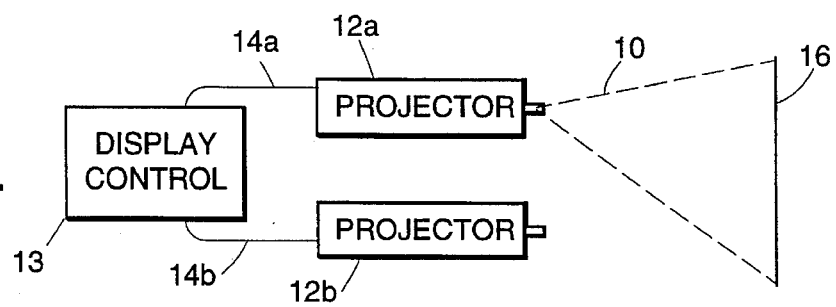

FIGS. 1a and 1b illustrate the basic concept of the two channel field sequential display system. The basic concept involves displaying two of the three color images 6, 8 during one part of the display frame, as shown in FIG. 1a, and the third color image 10 during another part of the display frame, as shown in FIG. 1b.

Two image generators 12a and 12b, such as projectors, make up the two display channels. A display controller 13 sends image information to the image generators 12a and 12b and also controls the timing of the image generators 12a and 12b through signal connections 14a and 14b. During a first part of the display frame (first field), a beam 6 from the first projector 12a projects one of the three primary image colors onto a screen 16, and simultaneously a beam 8 from the second projector 12b projects a second primary image color onto the same portion of the screen 16. During another part of the display frame (second field), the third color is projected by one or both projectors 12a, 12b onto the same screen 16, such that its position on the screen 16 is the same as the previous two colors 6, 8. While this concept may be implemented with any three colors that collectively form the color image, the preferred embodiment uses the conventional red, green and blue colors of RGB systems and displays red and green during the first field and blue sequentially during the second field. In the preferred embodiment, two fields per display frame are used.

In other embodiments, the number of fields per display frame, the order in which the colors are displayed by the two channels and which two of the three colors are displayed simultaneously can be varied to address specific display requirements. For example, using both channels to display the sequential color (blue in the preferred embodiment) can help boost the light output from the blue channel to compensate for a lower efficiency blue source. Using more than two fields can provide greater flexibility for compensating uneven luminance in the three colors and can also lead to increased projector light output.

Figure 2A:
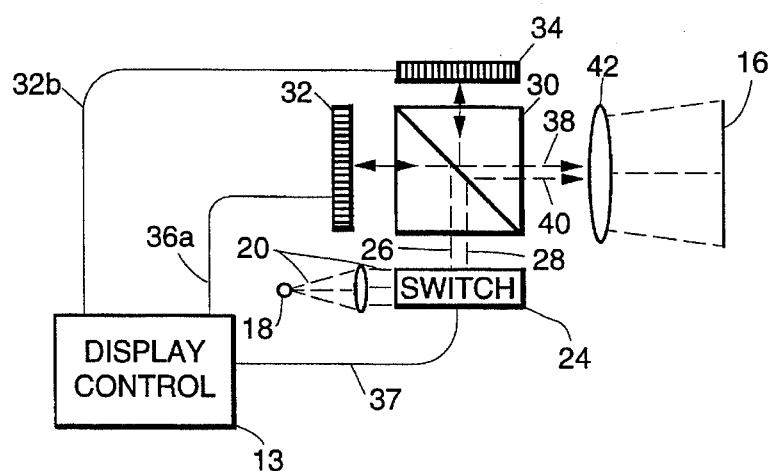
FIGS. 2a and 2b are schematic diagrams showing the operation of a two channel field sequential color display system implemented with reflective liquid crystal light valves.
Figure 2B:
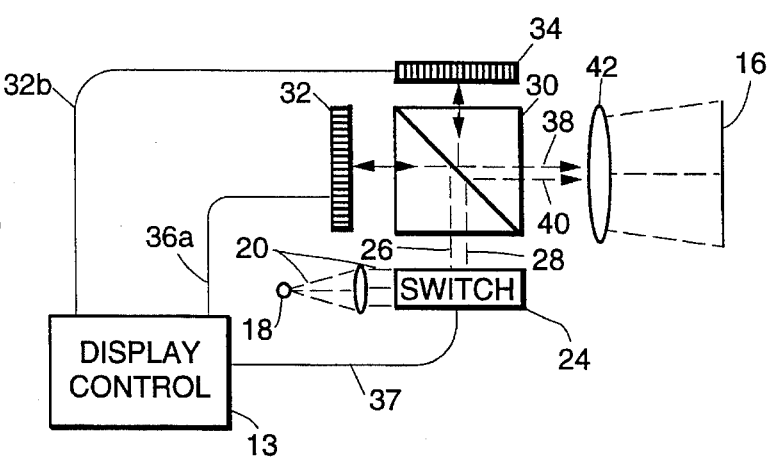

FIGS. 2a and 2b show the preferred embodiment in operation during the first and second fields of the display frame, respectively. A white light source 18 generates randomly polarized (unpolarized) white light 20. The unpolarized light 20 is collimated by a collimating lens 22 and enters a color polarization switch 24 that is shown in more detail in FIGS. 3a and 3b. The color polarization switch 24 polarizes and divides the white light 20 into red, green and blue color components.

During the first field, the color polarization switch outputs red S-polarized light 26 and green P-polarized light 28. The red S-polarized light 26 and the green P-polarized light 28 enter a polarizing beamsplitter 30 that reflects S-polarized light and passes P-polarized light. The red S-polarized light 26 is reflected towards a first active-matrix reflective liquid crystal light valve 32, which corresponds generally to projector 12a in FIG. 1a. The green P-polarized light 28 is transmitted through the polarizing beamsplitter 30 and towards a second active-matrix reflective liquid crystal light valve 34, which corresponds generally to projector 12b in FIG. 1a. Active-matrix reflective liquid crystal light valves are well known in the art. For a detailed description of these devices see Y. Takubo et al., "High Density Reflective Type TFT Array for High Definition Liquid Crystal Projection T.V. System", *Japan Display '89—Proceedings of the Ninth International Display Research Conference*, Oct. 16–18, 1989, 584–587 (1989).

In the preferred embodiment, electrically addressed light valves 32 and 34 are used, although photoconductively addressed light valves may be used in alternate embodiments. The electrically addressed light valves of the preferred embodiment are of the active-matrix type, which can address the individual optical elements in the light valve (not shown) simultaneously by application of an activating voltage. Thus the entire image is electronically written on the light valve simultaneously.

In one implementation of an active-matrix light valve, each element of the light valve has its own capacitor. These capacitors are addressed in a raster fashion by the display controller 13. When all of the capacitors have been addressed, the capacitors release their charge simultaneously to each of their respective elements.

Although one-shot active-matrix light valves are used in the preferred embodiment, line-sequentially addressed active matrix light valves may also be used. Such light valves are addressed in a raster mode. In a raster mode, the individual rows of light valve elements are activated one at a time. The image signal moves from one row to the next until all of the rows have been addressed.

Referring back to FIGS. 2a and 2b, both light valves receive image signals (that correspond to the color image being displayed) and synchronization signals from a display controller 13 over input lines 36a and 36b. The display controller 13 also sends synchronization signals to the color polarization switch 24 over line 37. The display controller 13 synchronizes the light valves 32 and 34 and the color polarization switch 24 such that the display controller 13 sends red image information to the first light valve 32 for processing while the red S-polarized light 26 is illuminating the first light valve 32 and sends green image information to the second light valve 34 for processing while the green P-polarized light 28 is illuminating the second light valve 34.

The first light valve 32 imparts the red image information onto the red S-polarized light 26, rotates the polarization of the red light 26 by 90 degrees (such that it is now P-polarized) and retro-reflects the image bearing red light 38 back towards the polarizing beamsplitter 30, where it passes through the beamsplitter 30 (since it is now P-polarized).

The second light valve 34 imparts the green image information onto the green P-polarized light 28, rotates the polarization of the green light 28 by 90 degrees (such that it is now S-polarized) and retro-reflects the image bearing green light 40 back towards the beamsplitter 30 where it is reflected by the beamsplitter 30 (since it is now S-polarized). The image bearing red 38 and green 40 light is then imaged by an imager 42 which in this example is an imaging lens onto a screen 16.

During the second field of the display frame, the color polarization switch outputs blue P-polarized light 44. The blue P-polarized light then enters the polarizing beamsplitter 30 where it passes through the beamsplitter 30 and illuminates the second liquid crystal light valve 34. The display controller 13 sends blue image information to the second light valve 34 for processing and synchronizes the second light valve 34 with the color polarization switch 24 such that the second light valve 34 processes the blue image information while the blue P-polarized light 44 is illuminating the second light valve 34.

The second light valve 34 imparts the blue portion of the image onto the blue P-polarized light 44, rotates the polarization of the blue light 44 by 90 degrees (such that it is now S-polarized) and retro-reflects the image bearing blue light 46 back towards the polarizing beamsplitter 30 where it is reflected by the beamsplitter 30 (since it is now S-polarized). The image bearing blue light 46 is then imaged by an imaging lens 42 onto the screen 16.

Figure 3A:
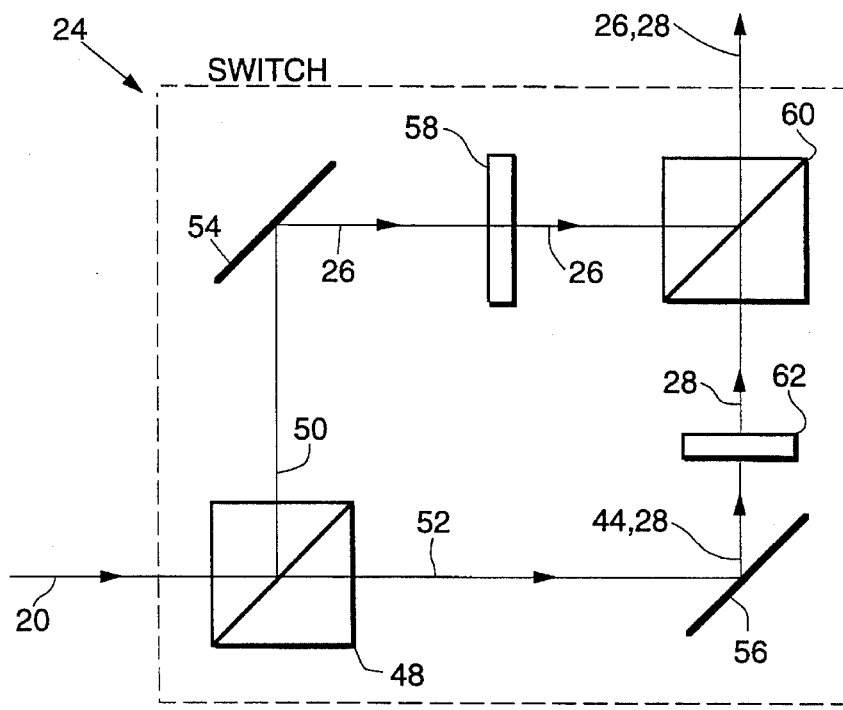
FIG. 3a and 3b are schematic diagrams showing the preferred implementation of a color polarization switch used in the systems of FIGS. 1 and 2.
Figure 3B:
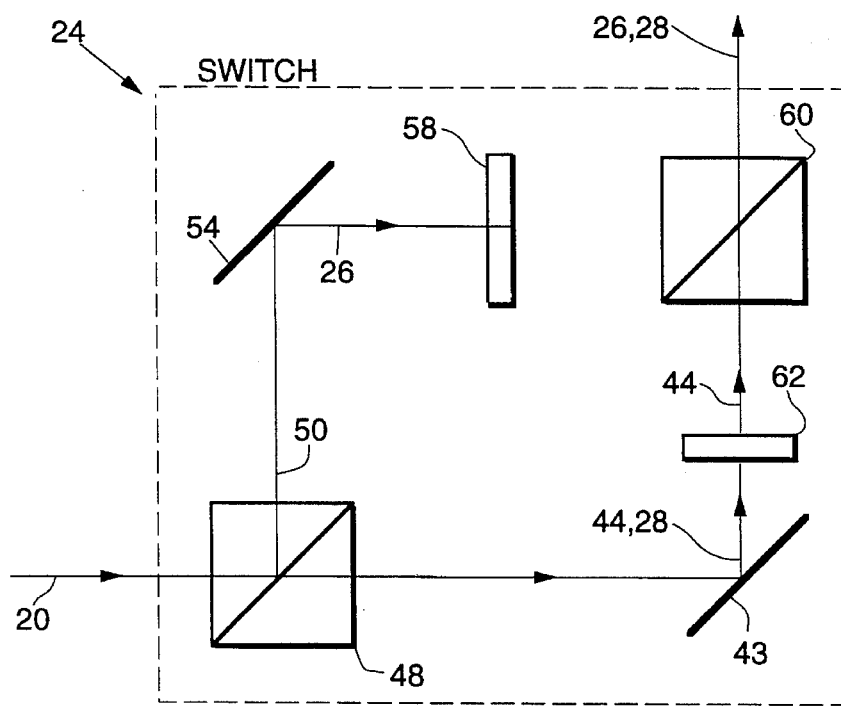

FIGS. 3a and 3b illustrate the operation of the color polarization switch 24 during the first and second fields of the display frame, respectively. The unpolarized white light 20 enters a polarizing beamsplitter 48 that reflects S-polarized light and transmits P-polarized light. The polarizing beamsplitter 48 splits the randomly polarized white light 20 into its S-polarization component 50 and P-polarization component 52. The S-polarized light 50 is reflected and strikes a dichroic beamsplitter 54 which reflects the red color component 26 of the S-polarized white light 50 and transmits the remaining light (not shown). The P-polarized component 52 is transmitted through the polarizing beamsplitter 48 and strikes a dichroic beamsplitter 56 which reflects the blue 44 and green 28 color components (cyan color) and transmits the rest of the light (not shown).

During the first field of the display frame (FIG. 3a), the S-polarized red light 26 passes through a shutter 58 and is reflected by a polarizing beamsplitter 60. The blue 44 and green 28 P-polarized light strike a blue/green switch 62 which blocks the blue light 44 and passes the green light 28. The blue/green switch 62 may be implemented with a liquid crystal light valve. The green P-polarized light 28 then passes through the polarizing beamsplitter 60 and is combined with the red S-polarized light 26. Both color components then exit the color polarization switch 24.

During the second field of the display frame, the red S-polarized light 26 is blocked by the shutter 58. The blue/green switch 62 blocks the green P-polarized light 28 and passes the blue P-polarized light 44, which then passes through the polarizing beamsplitter 60.

Figure 4A:
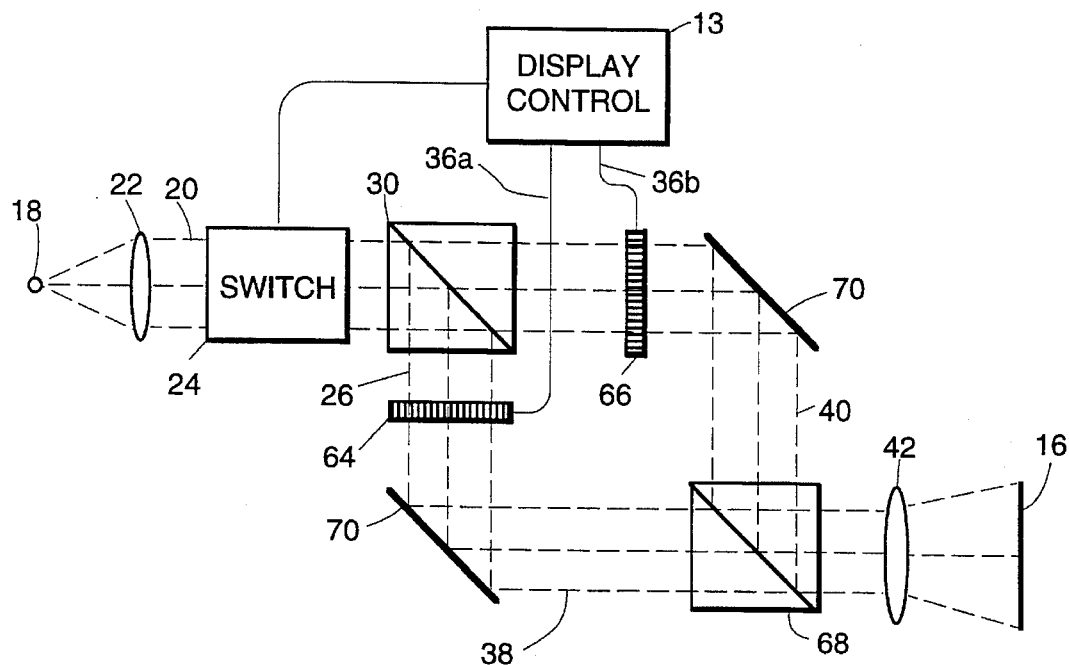
FIGS. 4a and 4b are schematic diagrams showing the operation of a two channel field sequential color display system implemented with transmissive liquid crystal light valves.
Figure 4B:
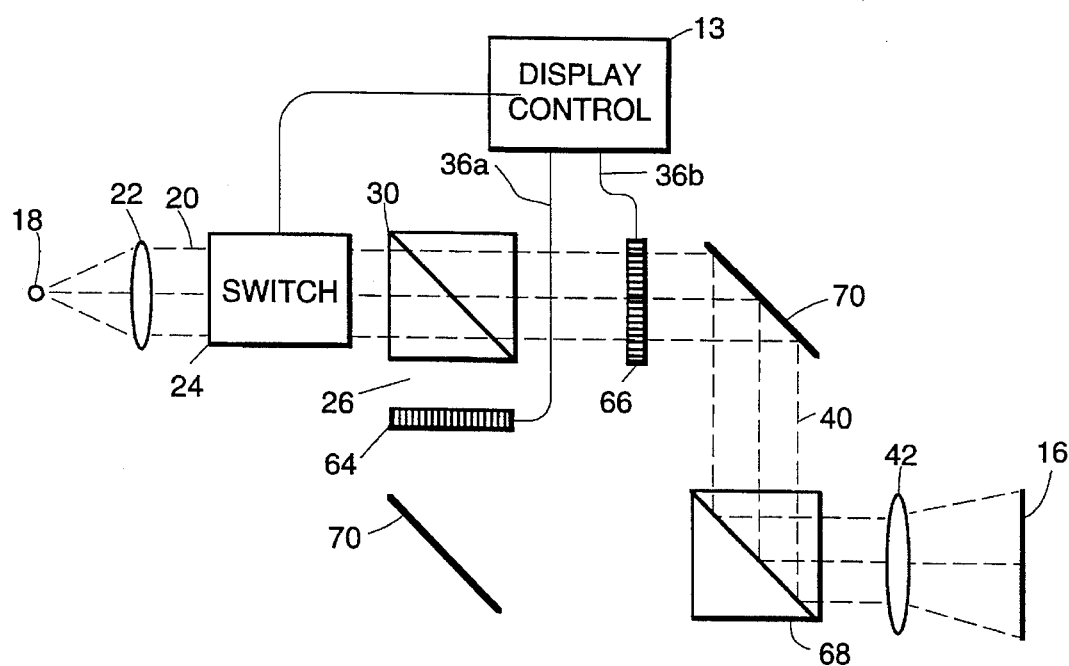

An embodiment which uses transmissive liquid crystal light valves 64, 66 is shown in operation during the first field and second field of a display frame in FIGS. 4a and 4b, respectively. The color polarization switch 24 and the liquid crystal light valves 64, 66 are synchronized in a manner similar to the synchronization of light valves 32 and 34 in the embodiment of FIGS. 2a and 2b. The operation of the system shown in FIGS. 4a and 4b is identical to the operation described above for the preferred embodiment, except for the substitution of transmissive liquid crystal light valves 64, 66 for the reflective liquid crystal light valves 32, 34 of the preferred embodiment. Since the color components 26, 28, 44 pass through the light valves 64, 66 (instead of being retro-reflected by the light valves), a second polarizing beamsplitter 68 is added to recombine the red 38 and green 40 image-bearing color components during the first field and to reflect the blue image-bearing color component 46 towards the imager 42 during the second field. A pair of reflectors 70, such as mirrors, are also added to direct the color components towards the second polarizing beamsplitter 68.

Numerous other variations and alternate embodiments will occur to those skilled in the art without departing from the spirit and scope of the invention. As mentioned above, the number of fields per display frame, the order in which the colors are displayed by the two channels and which two of the three colors are displayed simultaneously are parameters that can be varied to address specific display requirements. In addition, emissive displays could be used in place of liquid crystal light valves and the color polarization switch 24 could be replaced with a dichroic beamsplitter in combination with a red/green switch for certain applications. Accordingly, it is intended that the invention be limited only in terms of the appended claims.

I claim:

1. A two-channel field sequential color display system for generating a color image in response to electronic image signals, said two-channel field sequential color display system comprising:

a first active matrix liquid crystal light valve, a second active matrix liquid crystal light valve, and a controller for controlling said first and second active matrix liquid crystal light valves, to simultaneously display an image in a first and second color, respectively, during one part of a display frame, said images from said first and second image generators being superimposed on an image plane, and to display said image in a third color during a different part of said display frame, said image from said first and/or second image generators being displayed on said image plane during said different part of said display frame at the same location on said image plane as said images displayed during said one part of said display frame.

2. The system of claim 1, wherein said active matrix liquid crystal light valves are line sequentially addressed.

3. A two-channel field sequential color display system for generating a color image in response to electronic image signals, said color of said image having three color components, said two-channel field sequential color display system comprising:

an unpolarized white light source for generating randomly polarized white light, a collimator for collimating said white light, a color polarization switch for receiving and splitting said white light into three color components and for polarizing a first of said color components into S or P polarization, for polarizing a second of aid color components into a polarization orthogonal to said polarization of said first color component, and for polarizing a third color component into an S or P polarization, a display controller for storing said image signals and for controlling and timing the output of said color components, a polarizing light divider for receiving and splitting said polarized color components from said color polarization switch, said polarizing light divider transmitting either an S or a P polarization component and reflecting a polarization component that is orthogonal to the polarization component transmitted, a first reflective active matrix liquid crystal light valve for receiving said image signals from said display controller and for imparting said image signals from said image onto a first of said color components transmitted by said polarizing light divider during one part of a display frame, said light valve imparting an intensity distribution onto said color component that corresponds to the distribution of said first color component in said color image, said light valve retro-reflecting said image-bearing first color component back toward said polarizing light divider and rotating the polarization of said reflected first color component by 90 degrees such that said reflected first color component undergoes reflection at said polarizing light divider, a second reflective active matrix liquid crystal light valve for receiving said image signals from said display controller and for imparting said image onto a second of said color components reflected by said polarizing light divider during said one part of said display frame, said light valve imparting an intensity distribution onto said second color component that corresponds to the distribution of said second color component in said color image, said light valve retro-reflecting said image-bearing second color component back toward said polarizing light divider and rotating the polarization of said reflected second color component by 90 degrees, such that said reflected color component undergoes transmission at said polarizing light divider, said image-bearing reflected first and second color components from said first light valve and said second light valve recombining at said polarizing light divider, and an imager for simultaneously re-imaging said image imparted onto said recombined first and second color components onto an image plane during said one part of said display frame, said polarizing light divider reflecting and/or transmitting the third of said three color components during a different part of said display frame, said first and/or second active, matrix light valves receiving said image signals from said display controller and imparting said image onto said third color component reflecting and/or transmitted by said polarizing light divider during said different part of said display from, said first and or second light valves imparting an intensity distribution onto aid third color component that corresponds to the distribution of said color component in said color image, said first and/or second active matrix light valves retro-reflecting said image-bearing third color component back toward said polarizing light divider and rotating the polarization of said reflected third color component by 90 degrees, such that said reflected third color component undergoes transmission and/or reflection at said polarizing light divider, said imager re-imaging said image imparted onto said third color component onto said image plane during said different part of said display frame at the same location on said image plane as said image displayed during said one part of said display frame.

4. The system of claim 3, wherein said reflective active matrix liquid crystal light valves are line sequentially addressed.

5. The system of claim 3, wherein said color polarization switch comprises:
   a polarizing light divider for receiving and dividing said randomly polarized white light into S and P polarization components, said polarizing light divider transmitting either said S or P polarization component and reflecting the other polarization component,
   a wavelength separator for separating said white light into red, green and blue color components,
   a shutter for selectively blocking said red color component, and
   a blue/green switch for blocking a selectable one of said green and blue color components.

6. The system of claim 5, wherein said polarizing light divider comprises a polarizing beamsplitter.

7. The system of claim 5, wherein said wavelength separator comprises:
   a first dichroic mirror for extracting said red color component from said white light, and
   a second dichroic mirror for extracting said green and blue color components from said white light.

8. The system of claim 3, wherein said imager comprises a lens.

9. The system of claim 3, wherein said polarizing light divider comprises a polarizing beamsplitter.

10. A two-channel field sequential color display system for generating a color image in response to electronic image signals, said color on said image having three color components, said two-channel field sequential color display system comprising:
   an unpolarized white light source for generating randomly polarized white light,
   a collimator for collimating said white light,
   a color polarization switch for receiving and splitting said white light into three color components and for polarizing a first of said color components into S or P polarization, for polarizing a second of said color components into a polarization orthogonal to said polarization of said first color component, and for polarizing a third color component into an S or P polarization,
   a display controller for storing said image signals and for controlling and timing the output of said color components,
   a first polarizing light divider for receiving and splitting said polarized color components from said color polarization switch, said polarizing light divider transmitting either an S or a P polarization component and reflecting a polarization component that is orthogonal to the polarization component transmitted,
   a first transmissive line sequentially addressed active matrix liquid crystal light valve for receiving said image signals form said display controller and for imparting said image onto a first of said color components transmitted by said polarizing light divider during one part of display frame, said light valve imparting an intensity distribution only said color component that corresponds [to the distribution of said first color component in said color image, said light valve rotating the polarization of said reflected first color component by 90 degrees,
   a second transmissive line sequentially addressed active matrix liquid crystal light valve for receiving said image signals from said display controller and for imparting said image onto a second of said color components transmitted by said polarizing light divider during one part of a display frame, said light valve imparting an intensity distribution on said second color component that corresponds to the distribution of said second color component in said color image, said light valve rotating the polarization of said reflected second color component by 90 degrees, a second polarizing light divider for receiving said first and second color components from said first and second light valves, said light divider recombining said first and second color components, and an imager for simultaneously re-imagining said image imparted onto said recombined first and second color components onto an image plane during said one part of said display fame, said first polarizing light divider reflecting and/or transmitting the third of said three color components during a different part of said display frame, said first and/or second line sequentially addressed active matrix light valves receiving said image signals from said display controller and imparting said image on said third color component reflected and/or transmitted by said first polarizing light divide during said different part of said display frame, said first and/or second line sequentially addressed active matrix light valves imparting an intensity distribution on said third color component in said color image, said first and/or second line sequentially addressed active matrix light valves rotating the polarization of said third color component by 90 degrees, said second polarizing light divider receiving said third color component from said first and/or second light valves and transmitting and/or reflecting said third color component from said first and/or second light valves, said imager re-imaging said image imparted onto said third color component onto said image plane during said different part of said display frame at the same location on said image plane as said image displayed during said one part of said display frame.

11. The system of claim 10, wherein said color polarization switch comprises:

a polarizing light divider for receiving and dividing said randomly polarized white light into S and P polarization components, said polarizing light divider transmitting either said S or P polarization component and reflecting the other polarization component, a wavelength separator for separating said white light into red, green and blue color components, a shutter for selectively blocking said red color component, and a blue/green switch for blocking a selectable one of said green and blue color components.

12. The system of claim 11, wherein said polarizing light divider comprises a polarizing beamsplitter.

13. The system of claim 11, wherein said wavelength separator comprises:

a first dichroic mirror for extracting said red color component from said white light, and a second dichroic mirror for extracting said green and blue color components from said white light.

14. The system of claim 10, wherein said imager comprises a lens.

15. The system of claim 10, wherein said first and second polarizing light dividers comprise first and second polarizing beamsplitters.

16. A method of generating color images in response to an electronic signal, said color on said image having three color components, said method comprising the steps of:

generating two images in a selectable two of said three color components during one part of a display frame using line sequentially addressed active matrix liquid crystal light valves, said two images generated in said two color components having an intensity distribution that corresponds to the distribution of said color components in said color image, displaying said two images simultaneously on a screen during said one part of said display frame such that said two images overlap on said screen, during a different part of said display frame, generating a third image in the one of said three color components not displayed during said one part of said display frame, said third image generated in said color component having an intensity distribution that corresponds to the distribution of said color component in said color images, and displaying said third image on said screen during said different part of said display frame at the same location on said screen as said two images displayed during said part of said display frame.

* * * * *